May 8, 1923.
T. H. THOMAS
1,454,570
AUTOMATIC TRAIN CONTROL DEVICE
Filed June 5, 1922
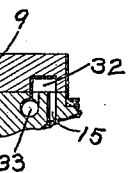
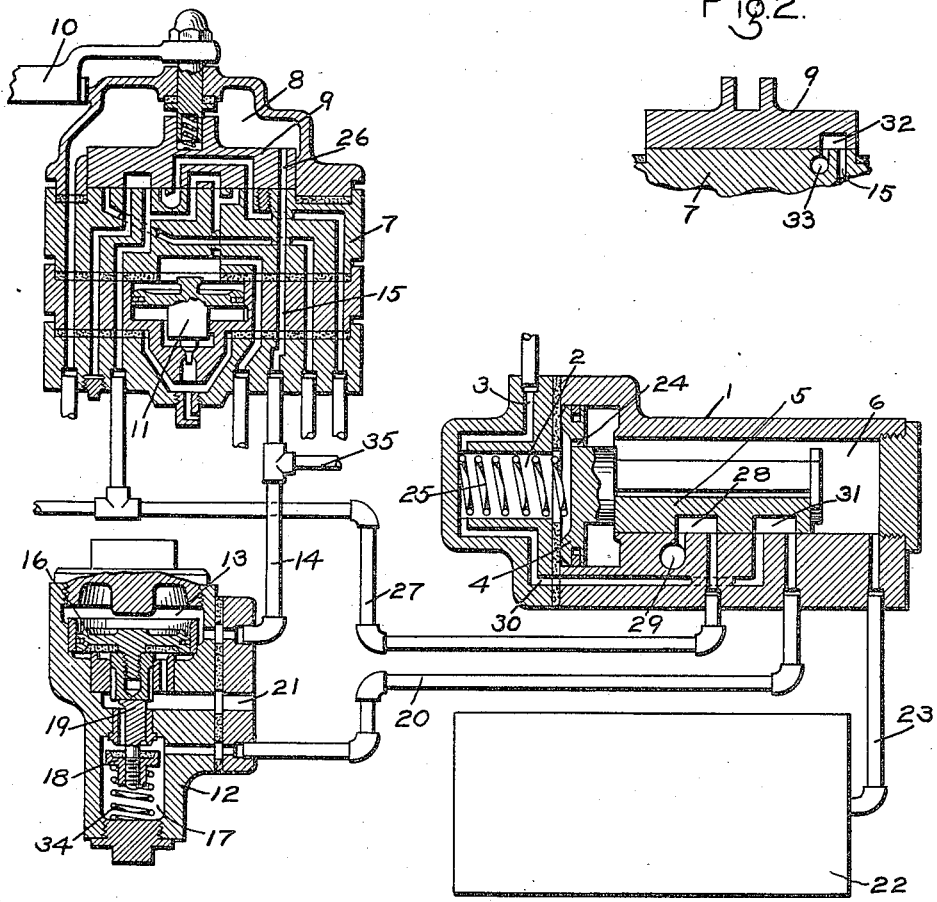
INVENTOR
THOMAS H. THOMAS
BY *Wm. N. Cady*
ATTORNEY Patented May 8, 1923.

1,454,570

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC TRAIN-CONTROL DEVICE.

Application filed June 5, 1922. Serial No. 566,026.

*To all whom it may concern:*

Be it known that I, THOMAS H. THOMAS, a citizen of the United States, residing at Edgewood, in the county of Allegheny and State of Pennsylvania, have invented new and useful Improvements in Automatic Train-Control Devices, of which the following is a specification.

This invention relates to automatic train speed control systems, and more particularly to means for manually releasing the brakes after the brakes have been applied by operation of the speed control apparatus.

In my prior application Serial No. 531,676, filed January 25, 1922, a speed control apparatus is disclosed in which an application valve device is provided for effecting an application of the brakes when operated by the speed control apparatus. In order to permit the engineer to effect the release of the brakes after automatic application, the brake valve is provided with a port adapted in running, release, and holding positions of the brake valve to connect the application valve device to an exhaust port, so that the application valve device would remain in application position, so long as the brake valve was in any of the above positions.

In application and lap positions, this port was blanked, thus permitting equalization of pressures on the application valve device and thereby the movement of the application valve device to release position.

The engineer could thus release the brakes after an automatic speed control application by moving the brake valve to lap or service application position.

In order to be able to employ the standard brake valve for use with the speed control equipment with as little change as possible, since there is a very large number of these brake valves already in service, an existing port connection in the brake valve was employed which was formerly used in connection with the control of a compressor governor, but when this port was used for release purposes in connection with the speed control equipment, it could not be used at the same time for governor control purposes.

The principal object of my invention is to provide a speed control release means in which the same port and pipe connections may be employed both for controlling the release and also the compressor governor.

In the accompanying drawing; Fig. 1 is a diagrammatic view, mainly in section, of a portion of a speed control apparatus, showing my invention applied thereto; and Fig. 2 a sectional view of the brake valve device in a position for effecting the release movement of the application valve device.

It is not deemed necessary for a clear understanding of the present invention to show the speed control apparatus as a whole and therefore only the application valve device portion is shown comprising a casing 1 having a piston chamber 2 connected to a passage 3 through which the fluid pressure in the chamber is varied by the operation of the speed control apparatus. Contained in said chamber is a piston 4 for operating a slide valve 5 contained in valve chamber 6.

The brake valve device is of the usual construction comprising a casing 7 having a valve chamber 8 containing a rotary slide valve 9 adapted to be operated by a handle 10, the casing also containing the usual equalizing discharge valve mechanism 11.

According to my invention, a pilot release valve device is provided comprising a casing 12 having a piston chamber 13, connected to pipe 14 which leads to a passage 15 in the brake valve device, and containing a piston 16. In a valve chamber 17 of the release valve device is contained a valve 18 connected to piston 16 by a stem 19 and adapted to control communication from a pipe and passage 20, leading to the seat of slide valve 5, to an atmospheric exhaust port 21.

In operation, the valve chamber 6 of the application valve device is maintained charged with fluid under pressure from the main reservoir 22 which is connected to valve chamber 6 by pipe 23. A restricted port 24 through piston 4 normally permits the equalization of fluid pressures on opposite sides of the piston and normally the passage 3 being closed, the equalization of fluid pressures on the piston 4 permits the spring 25 to move and hold the piston in its release position.

In running position, as shown in the drawing, and also in release and holding positions, the brake valve device is adapted to supply fluid under pressure to piston chamber 13, a port 26 through the rotary valve 9 being in registry with passage 15, and therefore the piston 16 is operated by fluid pressure in the above positions to open the valve 18.

When the speed control apparatus operates, fluid is vented from piston chamber 2 through passage 3 and the piston 4 is then operated by the fluid pressure in valve chamber 6, so as to shift the slide valve 5 to application position, as shown in Fig. 1. In this position the brake pipe 27 may be connected through a cavity 28 in slide valve 5 with an exhaust port 29, so that fluid is vented from the brake pipe to effect an application of the brakes in the usual manner.

In the application position of the slide valve 5, a passage 30 leading from the piston chamber 2 is connected through a cavity 31 with pipe 20, so that piston chamber 2 is now connected to exhaust port 21 past the open valve 18. It will thus be seen that the piston 4 will be held in release position even after the passage 3 has been closed by operation of the speed control mechanism, so that the brakes cannot be released so long as the valve 18 remains open.

In lap and service application positions of the brake valve, the passage 15 is connected by a cavity 32 with an exhaust port 33, as shown in Fig. 2, so that if the engineer desires to release the brakes he may do so by moving the brake valve handle to either service or lap position. Fluid is then vented from piston chamber 13 of the pilot release valve device, permitting the spring 34 to shift the valve 18 and piston 16 to the closed position. As soon as the valve 18 closes, the fluid pressures on opposite sides of piston 4 will equalize through port 24 and the spring 25 will return the piston and the slide valve 5 to release position, so as to effect the release of the brakes.

The compressor governor pipe 35 is connected to pipe 14, and since the usual control of the governor is effected by supplying fluid under pressure to the governor in release, running, and holding positions of the brake valve, it will be seen that the same pipe and passage connections may be used for the joint control of the pilot release valve and the compressor governor and consequently, brake valves already in service, which are provided with the usual governor control passage 15 may be employed in connection with speed control apparatus, the only change necessary being the provision of means in the brake valve for connecting the passage 15 with the exhaust in service and lap positions of the brake valve.

Having now described my invention, what I claim as new and desire to secure by Letters Patent, is:—

1. In a train speed control apparatus, the combination with an application valve device comprising a piston and valve, of a release valve device comprising a valve for controlling the venting of fluid from said piston, a release piston for operating said valve, and a brake valve device having means for controlling the fluid pressure on said release piston.

2. In a train speed control apparatus, the combination with an application valve device comprising a piston and valve, of a release valve device comprising a valve for connecting said piston to the atmosphere in the application position of the application valve device, a release piston for operating said valve, and a brake valve device having one position for supplying fluid under pressure to said release piston and another position for venting fluid from said piston.

3. In a train speed control apparatus, the combination with a brake valve device having a passage through which fluid under pressure is supplied to a compressor governor, and a rotary valve having means for supplying fluid to said passage in one position of the brake valve, of an application valve device including a fluid operated piston and a release valve device comprising a valve for venting fluid from said piston and a release piston connected to said governor control passage for operating said release valve.

In testimony whereof I have hereunto set my hand.

THOMAS H. THOMAS.